Figure 2:
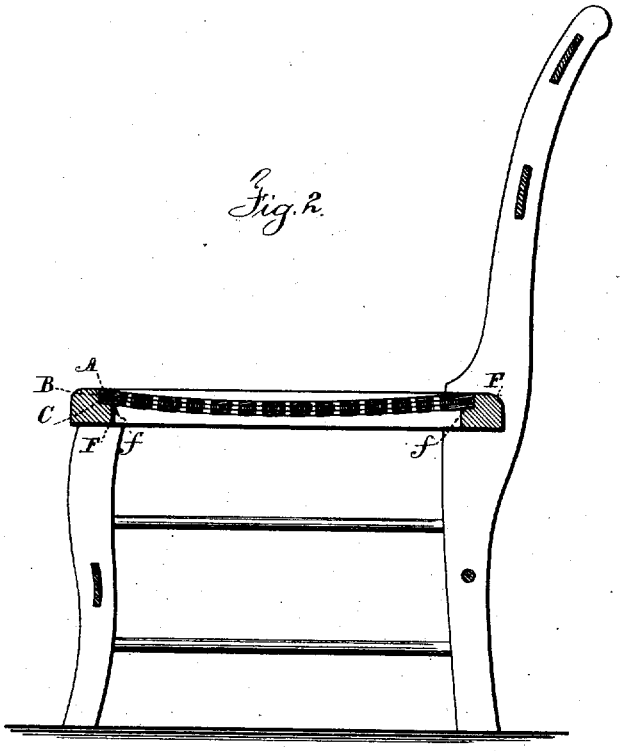

G. GARDNER,

Assignor, by mesne assignments, to O. L., W., & J. E. GARDNER.

Chair-Seat.

No. 9,094. Reissued Feb. 24, 1880.

Witnesses

Chas. N. Smith

Geo. J. Pinckney

Inventor

George Gardner.

Lemuel W. Serrell

Atty.

THE NORRIS PETERS CO., PHOTO-LITHO., WASHINGTON, D. C.

UNITED STATES PATENT OFFICE.

GEORGE GARDNER, OF WESTFIELD, NEW JERSEY, ASSIGNOR, BY MESNE ASSIGNMENTS, TO OLIVER L. GARDNER, WILLIAM GARDNER, AND JANE E. GARDNER.

CHAIR-SEAT.

SPECIFICATION forming part of Reissued Letters Patent No. 9,094, dated February 24, 1880.

Original No. 127,045, dated May 21, 1872; Reissue No. 7,203, dated July 4, 1876. Application for reissue filed October 31, 1879.

*To all whom it may concern:*

Be it known that I, GEORGE GARDNER, now of Westfield, in the State of New Jersey, have invented an Improvement in Chair-Seats, of which the following is a specification.

The state of the art in relation to devices having a similarity to my invention may be set forth as follows: In Letters Patent No. 15,552, granted August 19, 1856, a bedstead is described made of veneers glued together, with the grains crossing, and in such patent there is a statement that veneers crossing and glued together had been used for combining strength and lightness. In Letters Patent No. 19,405, February 23, 1858, chairs and other articles of furniture are described as made of layers of wood or veneers crossing each other, glued together, and pressed to shape. In Letters Patent No. 40,509, granted November 3, 1863, boxes are described as made of veneers or layers of wood crossing each other and glued together. In Letters Patent No. 23,225, granted March 15, 1859, a chair-bottom is described as made of a piece of board softened by steam and pressed up to shape in molds. In Letters Patent No. 110,096, December 13, 1870, a barrel is described of laminæ of wood with the grain crossing and glued together. Sheet metal perforated to form chair-bottoms is set forth in A. S. Smith's patent, reissued June 27, 1865. Chair-seats of enameled hard rubber and gutta-percha perforated are set forth in Letters Patent No. 54,863, May 7, 1866. Letters Patent No. 51,735, granted December 25, 1865, to J. K. Mayo, sets forth numerous articles made of laminæ of wood; and in a subsequent reissue, dated August 18, 1868, mention is made of a chair-seat, but the same was neither concave nor perforated.

My invention, as distinguished from the foregoing, relates to a new article of manufacture, consisting of a chair-seat made of veneers of wood, with the grains of one veneer crossing the other and glued together, and having a concave or dishing form, and perforated.

From the foregoing it will be apparent that I do not lay any claim to the veneers crossing each other and glued together, as these have been used for various purposes, and even for furniture, and have become public property. Neither do I claim the pressing of a chair-seat into a concave form by dies. Neither do I claim a perforated seat, as sheet metal has been employed; but it is cold to the person, and liable to break and to catch the clothing. Neither do I claim a single layer of such material as hard rubber or gutta-percha perforated. This is so expensive as not to be adapted to general use.

My chair-seat is a new article possessing great strength and durability. It is very light and cheap. It forms an agreeable seat. It is not hot in summer or cold in winter. The perforations give the wood a handsome appearance and afford the required ventilation, and the seat is adapted to be secured to any chair-frame, as it is easily cut and fitted to the same, and the cost of these seats is less than those made of cane, and they are much more durable.

Figure 1:
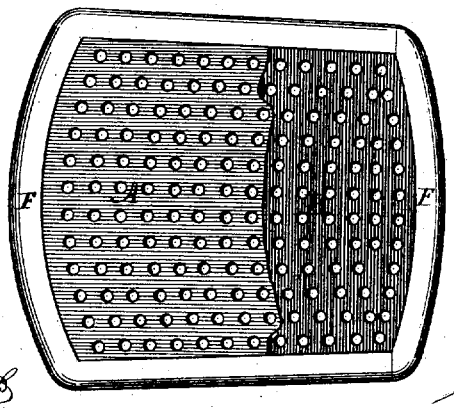

In the drawings, Figure 1 is a plan with the upper layer of veneer partially removed. Fig. 2 is a vertical section of the chair and seat.

I have shown three layers of veneers, A B C. The grain of the veneer A crosses that of the veneer B, and the grain of the veneer B crosses that of the veneer C, and these are cemented together by suitable adhesive substance, such as glue.

The seat is of a concave or dishing form, so as to be better adapted to the shape of the person, and the under side of the seat is convex.

The perforations through the seat are to be arranged to produce any design that may be agreeable to the fancy of the person making or using the chair. These perforations make the seat light, and also ventilate the same.

The edges of the seat rest upon and are secured to the chair-frame; and in Fig. 2 the frame is rabbeted to form shoulders *f*, upon which the edges of the seat rest.

I claim as my invention—

1. As a new article of manufacture, a chair-seat formed of laminæ of wood with the grain crossing, glued together, and concave on the upper surface and convex on the lower surface, adapted to a chair-frame, substantially as set forth.

2. A chair-seat made of laminæ of wood glued together, with the grains in one layer crossing those of the next, concave on the upper surface, convex on the lower surface, and perforated, as a new article of manufacture, substantially as set forth.

Signed by me this 7th day of October, A. D. 1879.

GEO. GARDNER.

Witnesses:
GEO. T. PINCKNEY,
WILLIAM G. MOTT.